US010440175B1

(12) United States Patent
Dover

(10) Patent No.: US 10,440,175 B1
(45) Date of Patent: Oct. 8, 2019

(54) DYNAMIC CONTROLLED-ENVIRONMENT FACILITY RESIDENT COMMUNICATION ALLOCATION BASED ON CALL VOLUME

(71) Applicant: Securus Technologies, Inc., Carrollton, TX (US)

(72) Inventor: Patrick Dover, Highland Village, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 16/295,135

(22) Filed: Mar. 7, 2019

(51) Int. Cl.
*H04M 1/66* (2006.01)
*H04M 1/68* (2006.01)
*H04M 3/16* (2006.01)
*H04M 3/38* (2006.01)
*H04M 3/36* (2006.01)
*H04M 3/22* (2006.01)

(52) U.S. Cl.
CPC .......... *H04M 3/38* (2013.01); *H04M 3/2272* (2013.01); *H04M 3/367* (2013.01)

(58) Field of Classification Search
CPC ...... H04M 15/08; H04M 15/47; H04M 15/58; H04M 15/72; H04M 15/755; H04M 15/8061; H04M 15/8214; H04M 3/2218; H04M 3/2263; H04M 3/367; H04M 3/42178
USPC .... 455/414.1, 416, 418, 450, 424, 446, 423, 455/452.2
See application file for complete search history.

(56) References Cited

U.S. PATENT DOCUMENTS

| | | | | |
|---|---|---|---|---|
| 9,811,363 B1* | 11/2017 | Wagner | ............... | G06F 9/45516 |
| 9,811,434 B1* | 11/2017 | Wagner | ............... | G06F 9/45516 |
| 9,830,175 B1* | 11/2017 | Wagner | ................. | G06F 9/5077 |
| 9,830,449 B1* | 11/2017 | Wagner | .................. | G06F 21/53 |
| 2016/0127539 A1* | 5/2016 | Sharma | ............. | G06F 16/24573 379/112.09 |
| 2017/0180567 A1* | 6/2017 | Sharma | ................. | H04M 15/00 |

* cited by examiner

*Primary Examiner* — Joseph Arevalo
(74) *Attorney, Agent, or Firm* — Fogarty LLP

(57) ABSTRACT

Dynamic controlled-environment facility resident communication allocation based on call volume may be implemented using a controlled-environment facility secure communication platform. The platform monitors controlled-environment facility resident call volume, recognizes an average call volume and detects an increase in call volume above the average call volume or a decrease in call volume below the average call volume. The platform automatically initiates a controlled-environment facility resident calling restriction in response to a detected increase in call volume or automatically initiates an increase in controlled-environment facility resident calling allocation in response to a detected decrease in call volume below the average call volume. Thereafter, the platform automatically removes the calling restriction upon the call volume dropping to a first predetermined threshold in accordance with the average call volume or automatically remove the increase in calling allocation upon the call volume rising to a second predetermined threshold in accordance with the average call volume.

21 Claims, 3 Drawing Sheets

DYNAMIC CONTROLLED-ENVIRONMENT FACILITY RESIDENT COMMUNICATION ALLOCATION BASED ON CALL VOLUME

TECHNICAL FIELD

This specification is related to communications by residents of controlled-environment facilities, specifically regulating communications by residents of controlled-environment facilities, and particularly to dynamic controlled-environment facility resident communication allocation based on call volume.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provide residents of controlled-environment facilities (such as correctional facilities) including allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents of the controlled-environment facility and non-residents, and in some cases, between residents of the same facility and/or other facilities.

Typically, calling restrictions currently in use in controlled-environment facility calling platforms are configured to either be on or off. Although currently controlled-environment facility staff does not have visibility to call volumes, if facility staff notices, or is informed of, an increase in phone use by a particular resident, they must manually turn on calling restrictions, which would not allow the resident to make (or receive) calls through the controlled-environment facility calling platform. Similarly, removal of such call restrictions would have to be manually carried out by facility personnel.

Over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to sufficiently, manually, regulate calling by inmates in a particularized manner based on a particular resident's, or group of residents', actions or behavior.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide dynamic controlled-environment facility resident communication allocation based on call volume. Therein, controlled-environment facility secure communication platform, comprising a controlled-environment facility communications processing system and/or a controlled-environment facility administration and management system, monitors controlled-environment facility resident call volume, recognizes an average call volume and detects an increase in call volume above the average call volume or a decrease in call volume below the average call volume. This controlled-environment facility resident call volume may comprise at least the number and/or duration of calls. Recognizing the average call volume may include recognizing an average call velocity, as at least a part of recognizing an average call volume, said call velocity comprising the volume of calls over a predetermined period of time. Detecting the increase in call volume may, at least in part, include detecting an increase in call velocity.

The controlled-environment facility secure communication platform automatically initiates a controlled-environment facility resident calling restriction in response to a detected increase in call volume/velocity or automatically initiates an increase in controlled-environment facility resident calling allocation in response to a detected decrease in call volume/velocity below the average call volume/velocity. The calling restriction may limit a number of calls a particular controlled-environment facility resident can make and/or an amount of time the particular resident can use at least one type of controlled-environment facility communication device. The increase in calling allocation may increase the number of calls a particular controlled-environment facility resident can make and/or the amount of time the particular resident can use the at least one type of controlled-environment facility communication device. That is, the calling restriction may allow more shorter calls, or fewer longer calls, and the increase in calling allocation may allow more calls and/or longer calls. More particularly, the calling restriction may either limit a number of calls a particular controlled-environment facility resident can make and not limit an amount of time the particular resident can use at least one type of controlled-environment facility communication device, or limit an amount of time the particular resident can use at least one type of controlled-environment facility communication device and not limit a number of calls the particular resident can make on this (these) type(s) of controlled-environment facility communication device(s). Conversely, the increase in calling allocation may increase the number of calls a particular controlled-environment facility resident can make on, and/or an amount of time the particular resident can use, at least one type of controlled-environment facility communication device.

Thereafter, the controlled-environment facility secure communication platform may then determine that the call volume is approaching the average call volume and may automatically remove the calling restriction upon the call volume dropping to a first predetermined threshold in accordance with the average call volume or automatically remove the increase in calling allocation upon the call volume rising to a second predetermined threshold in accordance with the average call volume. Detecting the decrease in call volume may, at least in part, include detecting a drop in call velocity, and determining the call volume is approaching the average call volume may, at least in part, include determining the call velocity is approaching the average call velocity.

The controlled-environment facility resident call volume may be the call volume of a particular resident of the controlled-environment facility. In such cases the calling restriction may be initiated and removed, or the increase in calling allocation may be initiated and removed, with respect to that particular resident.

Alternatively, or additionally, the controlled-environment facility resident call volume may be the call volume of a particular housing area of the controlled-environment facility, and the calling restriction may be is initiated and removed, or the increase in calling allocation is initiated and removed, with respect to the particular housing area.

As a further addition or alternative, the controlled-environment facility resident call volume may be the call volume of residents of a particular housing area of the controlled-environment facility, and the calling restriction is initiated and removed, or the increase in calling allocation is initiated and removed, with respect to the residents of the particular housing area.

One or more controlled-environment facility communications devices may be located in and/or associated with a particular housing area of the controlled-environment facility. In such cases, the controlled-environment facility resident call volume may be the call volume on one or more controlled-environment facility communications devices located in one particular housing area. Whereby, the controlled-environment facility secure communication platform may initiate and remove the calling restriction, or initiate and remove the increase in calling allocation, with respect to the controlled-environment facility communications devices located in that particular housing area.

In yet another addition or alternative, the controlled-environment facility resident call volume may be the call volume into and/or out of a controlled-environment facility and the controlled-environment facility secure communication platform may initiate and remove the calling restriction, or initiate and remove the increase in calling allocation, with respect to controlled-environment facility resident communications devices located in and/or associated with the controlled-environment facility, in general.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
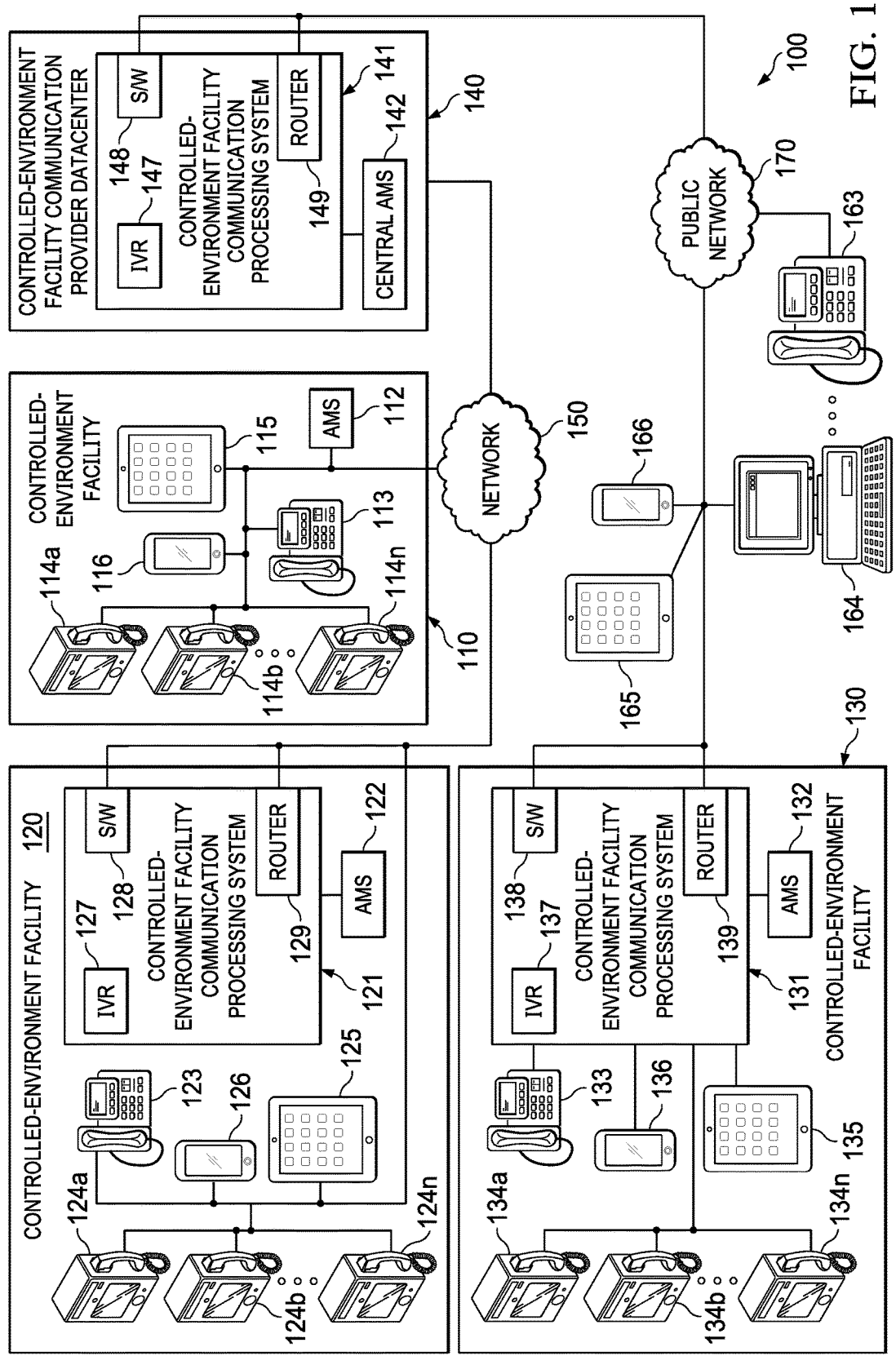
Figure 2:
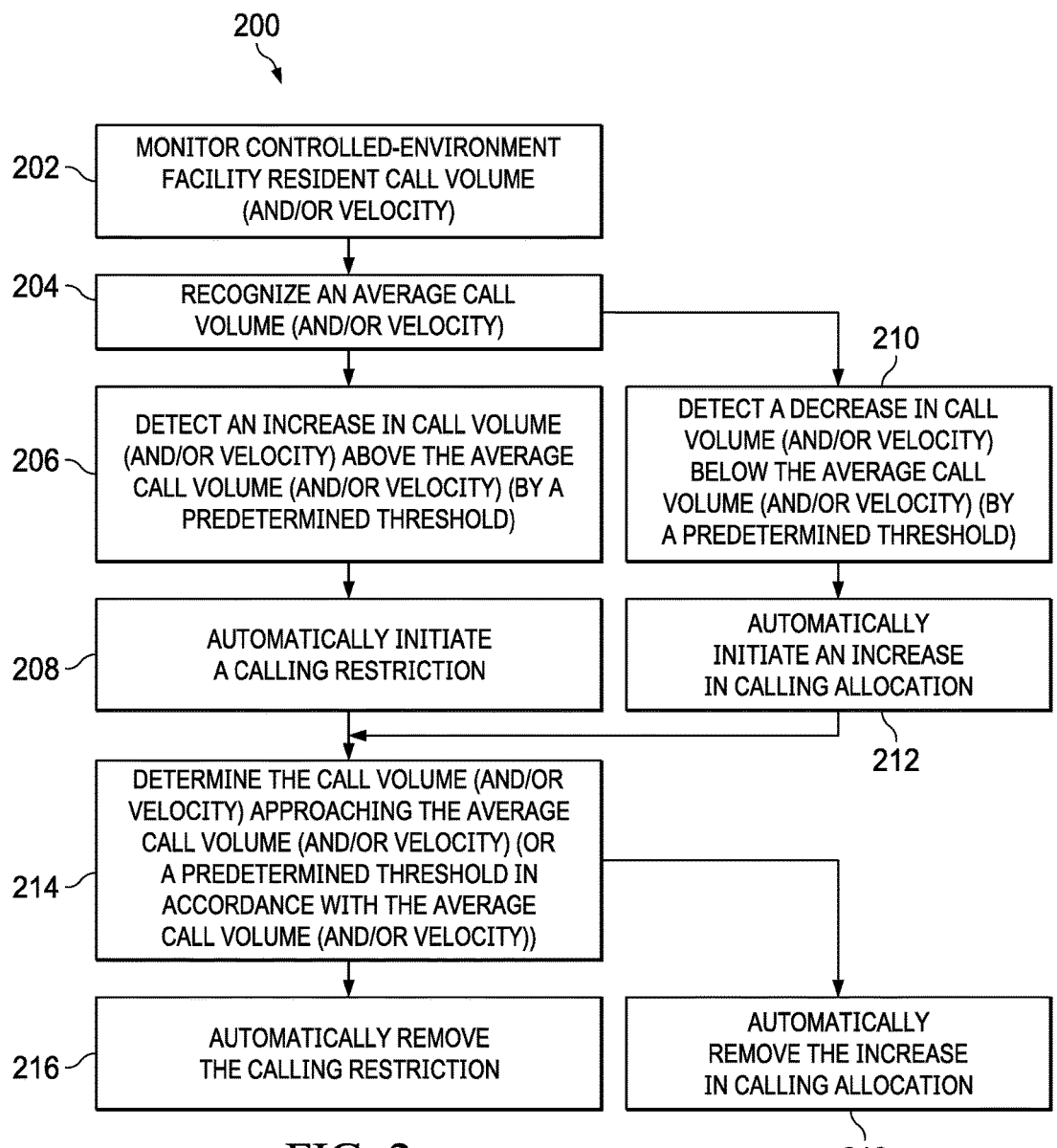
Figure 3:
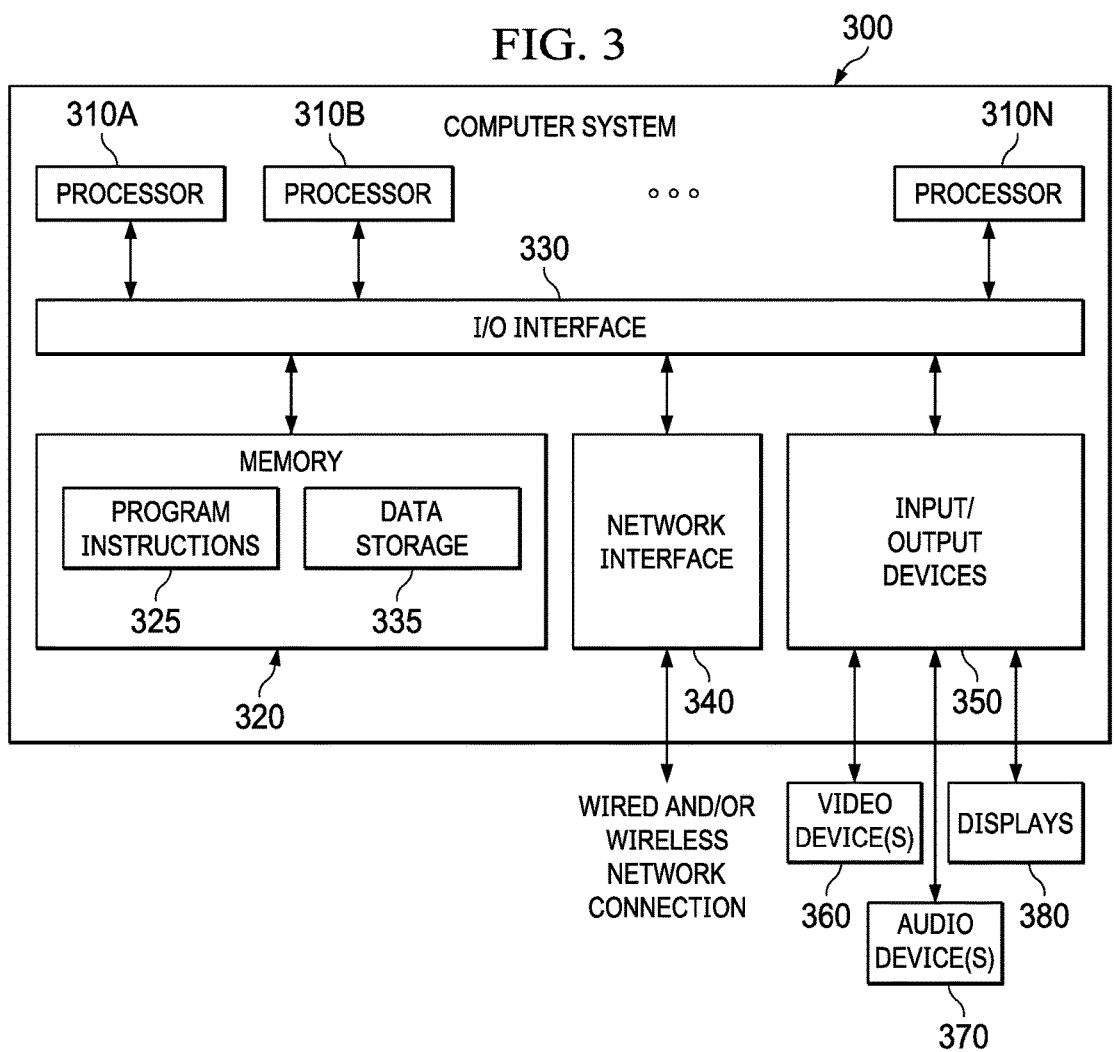

Having thus described the invention in general terms, reference will now be made to the accompanying drawings, which are not necessarily drawn to scale, and wherein:

FIG. 1 is a diagrammatic illustration of an example communications environment, wherein example embodiments of the present systems and methods for dynamic controlled-environment facility resident communication allocation based on call volume may be employed, according to some embodiments;

FIG. 2 is a flowchart of an example process for dynamic controlled-environment facility resident communication allocation based on call volume, in accordance with some embodiments; and FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods are generally related to communications by residents of controlled-environment facilities, specifically to regulating communications by residents of controlled-environment facilities, and particularly to dynamic controlled-environment facility resident communication allocation based on call volume. In accordance with embodiments of the present systems and methods, dynamic controlled-environment facility resident communication allocation based on call volume may be implemented using a controlled-environment facility secure communication platform. The platform monitors controlled-environment facility resident call volume, recognizes an average call volume and detects an increase in call volume above the average call volume or a decrease in call volume below the average call volume. The platform automatically initiates a controlled-environment facility resident calling restriction in response to a detected increase in call volume or automatically initiates an increase in controlled-environment facility resident calling allocation in response to a detected decrease in call volume below the average call volume. Thereafter, the platform automatically removes the calling restriction upon the call volume dropping to a first predetermined threshold in accordance with the average call volume or automatically remove the increase in calling allocation upon the call volume rising to a second predetermined threshold in accordance with the average call volume.

Embodiments of the present systems and methods may monitor controlled-environment facility resident call volume (e.g., the number and/or duration of calls) and recognize an average call volume. If a rapid increase of call volume occurs, the present systems and methods automatically initiate a calling restriction. This calling restriction limits either the number of calls the resident can make or the number of minutes the resident can use on the phone. In some embodiments both the number and duration of calls may be limited and/or "variable calling restrictions" may be used, for example, allowing more shorter calls or fewer longer calls. This has the advantage of preventing residents from monopolizing facility phones (or bandwidth) during call volume spikes. Call volume spikes may occur, as a result of an event, such as when controlled-environment facility phones are turned on after being turned off for a period of time, during a holiday, such as Mother's Day, during a sporting event, etc. Other possible reasons for call volume spikes may be that a nefarious action is imminent, such as discussed below. Each facility may define call volume spikes differently, it may be a percentage over the norm median call length, or it may be defined as a sudden increase in the number of calls and/or burst of calls. When call volume drops to the last recorded average the calling restriction is automatically removed (i.e., turned off).

Conversely, if a rapid decrease in call volume occurs, the present systems and methods automatically allow a greater volume of calls. This increase may be afforded in the number of calls the resident can make or the number of minutes the resident can use on the phone. In some embodiments both the number and duration of calls may be increased and/or "variable calling allocation" may be used, in accordance with embodiments of the present systems and methods.

As used herein, the word "calls" may refer to voice calls (i.e., telephone calls, analog or digital), VoIP (voice over internet) calls, video teleconferences (which may or may not include video visitations, in accordance with varying embodiments), chat sessions, general data usage, such as for downloading of streaming digital content, or the like. Also, as used herein, the phrase "call volume" (and/or the word "volume") generally refers to the number and/or length of calls, such as the total number of calls and/or the total length of calls (such as for a particular controlled-environment facility resident). Correspondingly, as used herein, the phrase "call velocity" (and/or the word "velocity") generally refers to the total call volume, over a given (predetermined) period of time.

As noted, embodiments of the present systems and methods dynamically controlled-environment facility resident communication allocation based on call volume by placing call velocity restrictions on, or increasing allowed call velocity for, controlled-environment facility residents. Such call velocity restrictions may be necessary based on the number of residents (making use of the phones and/or bandwidth) of the respective controlled-environment facility and the number of available phones, terminals, bandwidth, or the like available in the facility. For example, a typical correctional facility may have a set number of phones necessary to afford each resident one call per week, of approximately fifteen minutes duration. Hence, these factors may change as a result of resident influx or outflow, resulting in changes in call volume. In accordance with embodiments of the present systems and methods, thresholds used to determine when (e.g., at what resident call velocity) a calling restriction, or an increase in allowed calling volume, is initiated may be dynamic, in that, when a spike in call velocity, or conversely a lull in call activity, is detected, a change in resident call restrictions may be implemented. In this manner, dynamic controlled-environment facility resident communication allocation based on call velocity may be instituted to insure fair access to communications by facility residents.

The present systems and methods may also notify correctional facility staff of changes in call volume which may be indicative of an imminent inmate uprising. That is, a high call volume (with relatively low call velocity, i.e., short duration calls) may occur due to a reason related to the facility itself, such as an impeding riot, or the like. Whereas in the event of excess call velocity (i.e., number and length of calls) it may become necessary to, in accordance with embodiments of the present systems and methods, shutdown the facilities phones, at least for access by the most egregious call velocity (and/or volume) users.

When considering a controlled-environment facility's call volume (or velocity), the call volume (or velocity) for the entire facility may be taken into account, or alternatively, or additionally, the call volume (or velocity) of one or more particular housing areas (e.g., pods, cell blocks, or the like) of the facility may be considered. In any case, some call volume (or velocity) anomalies are expected, particularly on particular days or at particular times. For example, in correctional facilities, more calls are placed on Mother's Day (i.e., call volume) than on any other day.

FIG. 1 is a diagrammatic illustration of example controlled-environment facility communications environment 100, wherein example embodiments of the present systems and methods for dynamic controlled-environment facility resident communication allocation based on call volume may be employed, for example with respect to multiple controlled-environment facilities 110, 120, etc., and/or a single controlled-environment facility (130), according to some embodiments. Therein, onsite communication processing system 121, 131, external centralized communication processing system 141, such as may be deployed in a controlled-environment facility communications provider data center (140), or the like may provide telephone services, videoconferencing, online chat, and other communication services to residents of respective controlled-environment facility 110, 120, 130, etc. As illustrated, in some cases, a communication processing system (121, 131,) may be co-located with a controlled-environment facility (120, 130, respectively). Alternatively, as also illustrated, a communication processing system (141) may be centrally or remotely located, such as in controlled-environment facility communications provider data center 140 in whole (such as with respect to facility 110) or in part (such as with respect to facility 120). Controlled-environment facility communications provider data center 140, and hence external centralized communication processing system 141, may be connected to such facilities via a public network (e.g., the Internet) or a private network, or the like (e.g., via a secure tunneling protocol over the internet, using encapsulation) (150) and may provide communication services to such multiple controlled-environment facilities. More generally, however, it should be noted that communication systems 121, 131, 141, etc. may assume a variety of forms, comprising, including and/or embodying telephony switches, such as electronic switching systems, or the like, and/or and may be configured to serve a variety of facilities and/or users, whether within, or outside of, the respective controlled-environment facility.

In some implementations, wherein the controlled-environment communication system (121, 131) is located within the controlled-environment facility (120, 130), it may have direct access to an Administration Management System (AMS) 122, 132 (or a Jail Management System (JMS) in correctional environment embodiments) for garnering information used in accordance with various embodiments of the present systems and methods. In other embodiments where the (central) controlled-environment facility communication system (141) is located remotely with respect to the controlled-environment facility (110, 120, etc.), access to AMS (or JMS) 112, 122, etc. may (also) be obtained via a computer network such as, for example, network 150, for gathering information used in accordance with various embodiments of the present systems and methods. Additionally, or alternatively, in other embodiments where a (central) controlled-environment facility communication system (141) is employed, a central AMS (142) disposed in controlled-environment facility communications provider data center 140, as part of or in conjunction with controlled-environment facility communication system 141, may be employed.

In the context of a correctional facility, the respective JMS or AMS databases may also include information such as balances for inmate trust and calling accounts; trial schedule; conviction data; criminal record; sentencing data, time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance commerce, determining credit worthiness of individuals, establishing and maintaining accounts, and handling purchases of goods and services), and inmate/resident management (including managing inmate information and tracking inmate activity).

In addition to providing certain visitation and communication operations, communication processing systems 121, 131, 141, etc. and/or AMS (or JMS) 112, 122, 132, 142, etc. may attempt to ensure that a resident's calls, video conferences, online chats, etc. are performed only with non-residents whose identities, devices, email addresses, phone numbers, etc. are listed in that resident's Personal Allowed Number (PAN) or Pre-Approved Contact (PAC) list. Each resident's PAN or PAC list may be stored, for example, in a database maintained by respective AMS (or JMS) 112, 122 or 132, 142, or the like. In addition to PAN or PAC list(s), AMS (or JMS) 112, 122 or 132, 142 (databases), or the like, may also store inmate or resident profile data (RPD), as well as visitation rules applicable to each inmate or resident, Communication Detail Records (CDRs), or similar records, for resident phone calls, video visitations, texts, online chats, or the like.

Residents may use more-or-less conventional telephones 113, 123, 133, or the like to access certain communication services, under control of respective communication processing system 121, 131, 141, etc. In accordance with embodiments of the present systems and methods more-or-less conventional telephones 113, 123, 133 may be camera-enabled, or otherwise associated with controlled-environment facility cameras, or the like. Additionally, or alternatively, in some facilities a resident may use an intelligent controlled-environment facility media and/or communications terminal 114a through 114n, 124a through 124n, 134a through 134n, or the like, to place voice calls, as well as for video visitation, under control of respective communication processing system 121, 131, 141, etc. Such an intelligent controlled-environment facility media and/or communications terminal may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an intelligent controlled-environment facility resident media and/or communications device, Intelligent Resident Device (IRD), or the like, and in a correctional institution embodiment, as an intelligent imamate media and/or communications device Intelligent Inmate Device (IID), or the like. As will be appreciated, IRDs, IFDs, or other similar devices, as well as phones 113, 123, 133, etc. have communications capabilities, to enable a party to participate in telephone calls, video visitation sessions (video calls), or the like with other call parties, such as non-residents, under control of respective communication processing system 121, 131, 141, etc.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset, during video visitation call or during a voice call. Complementarily, the IFD may provide an audio signal from the non-resident to the resident using the earpiece portion of the handset, during such calls. Additionally, or alternatively, audio received from the non-resident may be reproduced via a loudspeaker, and audio provided by the resident may be captured via a microphone.

IFDs may be a replacement for typical telephones provided in controlled-environment facilities, such as rehabilitation centers, jails and prisons, utilizing existing facility telephony wiring. While the IFDs are generally illustrated in FIG. 1 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, checking the status of his or her case and/or requesting other controlled-environment facility services. The intelligent facility device may include an RFID or biometric reader, or the like to enable identification of each resident. In addition, the intelligent facility device includes, as noted, a built-in camera and telephone handset to enable a resident to use video conferencing to meet face to face with attorneys, family and friends. In accordance with embodiments of the present systems and methods, IFDs 114, 124, 134, etc. may be employed to facilitate implementation of embodiments of the present systems and methods, and/or to carry out all or certain aspects of embodiments of the present systems and methods.

As noted, IRDs 115, 125, 135, etc. may be tablet computing devices or smartphone/media players 116, 126, 136, etc. adapted and/or approved for use by residents of the respective controlled-environment facility (within the controlled-environment facility) 110, 120, 130, etc. Each IRD may be particularly adapted for use in a controlled-environment. For example, such an IRD may be "stripped-down," particularly from the standpoint of what applications programs (apps are provided or allowed on the IRD, and/or connectivity afforded to the IRD. By way of example, such an IRD may employ an operating system kernel that has been rebuilt for use in such a tablet computing device in a controlled-environment facility. As a further example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility, for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e., prevented by modifications to the device's operating system, or the like) and/or restricted, such as by requiring permission from a facility administrator, or the like. Apps provided on an IRD might include apps of particular interest to residents of the controlled-environment facility. For example, an IRD provided to inmates of correctional facilities, might include apps that may be of particular use to an inmate, in general, such as access to a legal research service, or of more specific interest, such as providing an inmate nearing release, access to employment searching apps or the like. Hence, such IRDs may be used to help soon to be released inmates' transition. For example, the IRD may be used to communicate with a future employer, or the like. As such, IRDs may be sponsored, or otherwise subsidized by organizations or companies, assisting with the transition of inmates into society. As noted, in accordance with embodiments of the present systems and methods, IRDs may be used to communicate with others, such as through phone calls, video calls, or the like.

For a resident to initiate an outgoing communication, the resident may initiate telephone services by lifting the receiver on telephone 113, 123,133, etc. or IFD 114, 124, 134, etc. and/or otherwise initiating a call, such as by launching an app on IRD 115, 125, 135, 116, 126, 136, etc. At which time, the resident may be prompted to provide a PIN, other identifying information or biometrics. In accordance with embodiments of the present systems and methods such biometric data may include the voice of the resident, an image of the resident, or the like. Interactive voice response (IVR) unit 127, 137 or 147, which may be integrated into communications processing system 121, 131 and/or 141, as illustrated, may generate and play a prompt or other messages to the resident. Under the control of communication processing system 121, 131 and/or 141, etc. the device may be capable of connecting with a non-resident's device (e.g., telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VoIP) or packet data network, such as for example the Internet, etc. Network 170 may be the same, or a different network, as network 150. Telephony switches 128, 138, 148 etc. in respective communication processing system 121, 131, 141, etc. may be used to connect calls across a PSTN (i.e., network 170), such as calls from controlled-environment facility telephone 113, 123 or 133 and non-resident telephone 163, which, in accordance with embodiments of the present systems and methods, may also be camera-enabled. Telephony router 129, 139, 149, etc., media gateway functionality, or the like of respective communication system 121, 131, 141, etc. may be used to route data packets associated with a digital call connection, via an Integrated Services Digital Network (ISDN), the Internet, or the like (i.e., network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VoIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally, or alternatively the non-resident devices may be disposed in a visitation area of controlled-environment facility 110, 120, 130, etc., which may be within, adjacent to, or remote with respect controlled-environment facility 110, 120, 130, etc., itself.

Centralized investigative data aggregation and analysis system 190 may provide investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as CDRs), so that an investigator may research them through an archive and may be provided access to internal and/or external criminal databases and/or other sources of useful information.

Controlled-environment facility communication processing systems 121, 131, 141, whether deployed in, or in conjunction with, a controlled-environment facility communications provider data center (140), or not, and/or working together (e.g., 141 and 121, working together), or not, and/or respective AMS or JMS 112, 122. 132, 142, may, each, or together, be referred to as a "controlled-environment facility secure communication platform," or the like. Thus, in accordance with various embodiments, the present systems and methods for dynamic controlled-environment facility resident communication allocation based on call volume may employ one or more controlled-environment facility communications management systems (121, 131 and 141) associated with at least one controlled-environment facility (110, 120 or 130) and/or may employ one or more AMS or JMS 112, 122. 132, 142. A controlled-environment facility secure communication platform may, in accordance with embodiments of the present systems and methods, be configured to perform communication monitoring operations, such as being configured to monitor and or record communication sessions (e.g., as electronic video files). Further, communication processing system 105, alone, or in conjunction with respective AMS or JMS 112, 122. 132, 142 (i.e., as a controlled-environment facility secure communication platform) may provide the present dynamic controlled-environment facility resident communication allocation based on call volume. In other embodiments, AMS or JMS 112, 122, 132, 142, alone, or in conjunction with communication processing system 121, 131 and/or 141, (i.e., as a controlled-environment facility secure communication platform) may provide the present dynamic controlled-environment facility resident communication allocation based on call volume.

Thus, in accordance with embodiments of the present systems and methods, communication processing system 121, 131 and/or 141, AMS or JMS 112, 122, 132, 142, and/or the like, may each include at least one processor and a memory coupled to the at least one processor, such as discussed in greater detail below, with reference to FIG. 3. This memory may be configured to store program instructions executable by the at least one processor. Such program instructions may, upon execution by the at least one processor, cause communication processing system 121, 131 and/or 141, AMS or JMS 112, 122, 132, 142, and/or the like (i.e., a controlled-environment facility secure communication platform), to monitor controlled-environment facility resident call volume and recognize an average call volume. This call volume may be the number and/or duration of calls for a particular resident, for a particular group of residents (e.g., members of a particular gang, residents being housed for another facility, or other identifiable group), for a particular controlled-environment facility resident calling device 113, 114, 115, 116, 123, 124, 125, 126, 133, 134, 135, 136, or the like, for a particular controlled-environment facility area, such as a particular pod of a correctional facility, or even for entire controlled-environment facility 110, 120, 130. Additionally, or alternatively, recognizing an average call volume may, in accordance with embodiments of the present systems and methods include at least recognizing an average call velocity. This, "call velocity" may be the volume of calls over a predetermined period of time, or the like.

Communication processing system 121, 131 and/or 141, AMS or JMS 112, 122, 132, 142, and/or the like, (i.e., the controlled-environment facility secure communication platform) may also detect an increase in call volume (and/or velocity) above this average call volume (and/or velocity), such as by determining the average call volume (and/or velocity) for the particular resident, group, device, area or facility exceeding a predetermined threshold. Conversely, communication processing system 121, 131 and/or 141, AMS or JMS 112, 122, 132, 142, and/or the like (i.e., the controlled-environment facility secure communication platform), may detect a decrease in call volume (and/or velocity) below this average call volume (and/or velocity), such as by determining the average call volume (and/or velocity) for the particular resident, group, device, area or facility falls below a predetermined threshold.

Communication processing system 121, 131 and/or 141, AMS or JMS 112, 122, 132, 142, and/or the like (i.e., the controlled-environment facility secure communication platform), may, in response to the call volume (and/or velocity) exceeding the threshold, initiate a calling restriction, in an automated manner, without involving facility personnel. Likewise, communication processing system 121, 131 and/or 141, AMS or JMS 112, 122, 132, 142, and/or the like, may (i.e., the controlled-environment facility secure communication platform), in response to the call volume (and/or velocity) falling below the respective threshold, initiate an increase in calling allocation, in an automated manner, without involving facility personnel.

Communication processing system 121, 131 and/or 141, AMS or JMS 112, 122, 132, 142, and/or the like (i.e., the controlled-environment facility secure communication platform), may then determine when the call volume (and/or velocity) again approaches (i.e., drops to (or toward) or rises to (or toward), respectively) the average call volume (and/or velocity) or approaches a respective a predetermined threshold in accordance with the average call volume (and/or velocity), and as a result, remove the calling restriction or increased calling allocation, in an automated manner, again, without involving facility personnel.

Embodiments of the present systems and methods may be employed in the above-described environment, such as in a manner described below, with respect to FIG. 2, a flowchart of example process 200 for dynamic controlled-environment facility resident communication allocation based on call volume, in accordance with some embodiments. Therein, a controlled-environment facility calling allocation system, such as may be embodied in a controlled-environment facility secure communication platform (i.e., communication processing system (121, 131 and/or 141), AMS or JMS (112, 122, 132, 142), and/or the like), may monitor controlled-environment facility resident call volume at 202 and at 204 recognize an average call volume. In accordance with various embodiments of the present systems and methods, for example, every fifteen-minute volume analysis, such as may make use of Call Detail Records (CDRs), generated auto CDRs, which can be tabulated to provide total number of call attempts and calls, as well as the time spent on each call. This may be used to automatically establish a threshold of controlled-environment facility communication device use frequency and/or time. Thus, this call volume may be the number and/or duration of calls for a particular controlled-environment facility resident (or group of residents), for a particular controlled-environment facility resident calling device (113, 114, 115, 116, 123, 124, 125, 126, 133, 134, 135, 136, or the like), for a particular controlled-environment facility area, such as a particular pod of a correctional facility, or even for the entire controlled-environment facility (110). Additionally, or alternatively, recognizing an average call volume at 204 may, in accordance with embodiments of the present systems and methods, include at least recognizing an average call velocity. This, "call velocity" may be the volume of calls over a predetermined period of time, or the like.

At 206, the controlled-environment facility calling allocation system, may detect an increase in call volume (and/or velocity) above the average call volume (and/or velocity), such as the call volume (and/or velocity) exceeding a predetermined threshold, or the like, whereupon the controlled-environment facility calling allocation system may at 208, automatically initiate a calling restriction. This calling restriction may limit a number of calls a subject controlled-environment facility resident can make and/or an amount of time (e.g., the number of minutes) the subject resident can use. The restrictions may apply with respect to one type of controlled-environment facility communication device, such as the type of device on which the resident exceeded a call volume (and/or velocity) threshold, or all, or other additional controlled-environment facility communications devices. Further, the calling restriction may allow more shorter calls, or fewer longer calls, thereby providing a variable calling restriction. Additionally, or alternatively, a number of calls a controlled-environment facility resident can make may be limited, without limiting an amount of time (e.g., the number of minutes) the resident can use one or more types of controlled-environment facility communications devices (113, 114, 115, 116, 123, 124, 125, 126, 133, 134, 135, 136, or the like). Conversely, the calling restriction imposed may limit an amount of time (e.g., the number of minutes) the resident can use one or more types of controlled-environment facility communications devices (113, 114, 115, 116, 123, 124, 125, 126, 133, 134, 135, 136, or the like), but not limit a number of calls the controlled-environment facility resident can make on that (those) device(s).

At 210, the controlled-environment facility calling allocation system, may detect a decrease in call volume (and/or velocity) below the average call volume (and/or velocity), such as the call volume (and/or velocity) falling below a respective predetermined threshold, or the like, whereupon the controlled-environment facility calling allocation system may at 212, automatically increase a calling allocation. This increase in the calling allocation may allow more calls and/or longer calls, such as with respect to a subject resident, device, group of residents, or the like. This increase may apply with respect to one or more types of controlled-environment facility communications devices (113, 114, 115, 116, 123, 124, 125, 126, 133, 134, 135, 136, or the like), or all, or other additional controlled-environment facility communications devices.

At 214, the controlled-environment facility calling allocation system, may then determine when the call volume (and/or velocity) again approaches the average call volume (and/or velocity) or to a predetermined threshold in accordance with the average call volume (and/or velocity). At 216, the calling restriction is automatically removed upon the call volume (and/or velocity) dropping to this predetermined threshold, as determined at 214. Likewise, at 218, the increase in calling allocation initiated at 212 is automatically removed upon the call volume (and/or velocity) rising to a respective predetermined threshold, as determined at 214.

In some embodiments, such as where the controlled-environment facility resident call volume monitored is the call volume (and/or velocity) of an individual (i.e., a particular) resident of the controlled-environment facility (110, 120, 130), the calling restriction is initiated at 208 and removed at 216, or the calling allocation is increased at 212 and removed at 218, with respect to that particular resident. Likewise, where the controlled-environment facility resident call volume monitored is the call volume (and/or velocity) of a particular group of residents (e.g., members of a particular gang, residents being housed for another facility or any other group identifier), the calling restriction may be initiated at 208 and removed at 216, or the calling allocation may be increased at 212 and removed at 218, with respect to that particular group of residents. Also, in some (other) embodiments, the controlled-environment facility resident call volume (and/or velocity) may be the call volume (and/or velocity) of a particular housing area of the controlled-environment facility (110, 120, 130), and/or of residents housed therein. In which case, the calling restriction may be initiated at 208 and removed at 216, or the calling allocation is increased at 212 and removed at 218, with respect to that particular housing area. In some (other) further embodiments, the controlled-environment facility resident call volume (and/or velocity) is the call volume (and/or velocity) on controlled-environment facility communications devices located in and/or associated with a particular housing area of the controlled-environment facility. Therein, the calling restriction may be initiated at 208 and removed at 216, or the calling allocation is increased at 212 and removed at 218, with respect to the controlled-environment facility communications devices located in and/or associated with the particular housing area. Moreover, in implementations, such as where a central communication processing system and/or AMS/JMS, and/or the like, are providing dynamic controlled-environment facility resident communication allocation based on call volume to a number of facilities, the controlled-environment facility resident call volume (and/or velocity) may be the call volume (and/or velocity) into and/or out of a particular controlled-environment facility and the calling restriction initiated at 208 and removed at 216, or the calling allocation is increased at 212 and removed at 218, may be for all of the controlled-environment facility resident communications devices located in and/or associated with the particular controlled-environment facility.

Embodiments of the present systems and methods, may be used to prioritize controlled-environment facility communications bandwidth, with respect to video communications (visitation), (voice) calls, data/content downloads, chat, emails, texts, etc. For example, while higher bandwidth consuming communications such as video (content downloads and/or voice calls) may be restricted due to controlled-environment facility communications bandwidth access volume (and/or velocity) lower bandwidth communications such as email, chat and/or text may be allowed to proceed. In contrast, less lucrative (to a communications provider and/or the controlled-environment facility) communications (e.g., video visitation) may be prioritized over lower bandwidth. less lucrative, communications (e.g., voice calls, chat, email, text, etc.)

Embodiments of the present systems and methods for dynamic controlled-environment facility resident communication allocation based on call volume, as described herein, may be implemented or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIG. 2, and/or a computer system such as computer system 300 may be used as, or as part of, one or more of controlled environment facility communications processing system 121, 131, 141, IFD 114, 124, 134, IRD 115, 116, 125, 126, 135, 136, non-resident media device 164, 165, 166, AMS or JMS 112, 122, 132, 142, and/or the like, may be implemented, in part, or in whole, as a computer system such as computer system 300. In various embodiments two or more of these computer systems may be configured to communicate with each other in any suitable way, such as, for example, via a network. For example, in FIG. 1, IFD 114, 124, 134, IRD 115, 116, 125, 126, 135, 136 are illustrated as communicating with non-resident equipment 164, 165, 166, via one or more of networks 150 and 170, through controlled-environment facility communication processing system 105. As a further example, IRD 125, 126, 135, 136 may wirelessly communicate with respective controlled-environment facility communication management system 121, 131 using wireless functionality, such as a wireless data network (i.e., a WLAN network, or the like). In such a controlled-environment facility wireless network, IFD 114, 124, 134 may act as a WLAN (or wired) access point or router, such as for IRD 115, 116, 125, 126, 135, 136, in accordance with some embodiments of the present systems and methods.

As illustrated, example computer system 300 includes one or more processors 310 coupled to a system memory 320 via an input/output (I/O) interface 330. Example computer system 300 further includes a network interface 340 coupled to I/O interface 330, and one or more input/output devices 350, such as video device(s) 360 (e.g., a camera), audio device(s) 370 (e.g., a microphone and/or a speaker), and display(s) 380. Computer system 300 may also include a cursor control device (e.g., a mouse or touchpad), a keyboard, etc. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 and 2, above, may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-readable medium may include any tangible or non-transitory storage media or memory media such as magnetic or optical media—e.g., disk or CD/DVD-ROM coupled to computer system 300 via I/O interface 330, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In some embodiments, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any suitable protocol, timing or other data transformations to convert data signals from one component (e.g., system memory 320) into a format usable by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments, some or all of the functionality of I/O interface 330, such as an interface to system memory 320, may be incorporated into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 3, memory 320 may include program instructions 325, configured to implement certain embodiments described herein, and data storage 335, comprising various data accessible by program instructions 325. In an embodiment, program instructions 325 may include software elements corresponding to one or more of the various embodiments illustrated in the above figures. For example, program instructions 325 may be implemented in various embodiments using any desired programming language, scripting language, or combination of programming languages and/or scripting languages (e.g., C, C++, C#, JAVA®, JAVASCRIPT®, PERL®, etc.). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for dynamic controlled-environment facility resident communication allocation comprising:
    a controlled-environment facility secure communication platform comprising:
    at least one processor; and
    a memory coupled to the processor, the memory having program instructions stored thereon that, upon execution by the processor, cause the controlled-environment facility secure communication platform to:
    monitor controlled-environment facility resident call volume, comprising at least the number and/or duration of calls;
    recognize an average call volume by, at least in part, recognizing an average call velocity, comprising the volume of calls over a predetermined period of time;
    detect an increase in call volume above the average call volume by, at least in part, detecting an increase in call velocity, or detect a decrease in call volume below the average call volume by, at least in part, detecting a drop in call velocity;
    automatically initiate a controlled-environment facility resident calling restriction in response to a detected increase in call volume or automatically initiate an increase in controlled-environment facility resident calling allocation in response to a detected decrease in call volume below the average call volume;
    determine the call volume approaches the average call volume, by at least in part determining the call velocity approaches the average call velocity; and
    automatically remove the calling restriction upon the call volume dropping to a first predetermined threshold in accordance with the average call volume or automatically remove the increase in calling allocation upon the call volume rising to a second predetermined threshold in accordance with the average call volume.

2. The system of claim 1, wherein the calling restriction limits at least one of a number of calls a particular controlled-environment facility resident can make and an amount of time the particular resident can use at least one type of controlled-environment facility communication device, and the increase in calling allocation increases at least one of the number of calls a particular controlled-environment facility resident can make and the amount of time the particular resident can use the at least one type of controlled-environment facility communication device.

3. The system of claim 1, wherein the calling restriction comprises allowing more shorter calls or fewer longer calls, and the increase in calling allocation allows more calls and/or longer calls.

4. The system of claim 1, wherein the calling restriction comprises one of:
limit a number of calls a particular controlled-environment facility resident can make and not limit an amount of time the particular resident can use at least one type of controlled-environment facility communication device; and
limit an amount of time the particular resident can use at least one same or other type of controlled-environment facility communication device and not limit a number of calls the particular resident can make on the at least one same or other type of controlled-environment facility communication device.

5. The system of claim 1, wherein the increase in calling allocation comprises increasing the number of calls a particular controlled-environment facility resident can make on, and/or an amount of time the particular resident can use, at least one type of controlled-environment facility communication device.

6. The system of claim 1, wherein the controlled-environment facility resident call volume is the call volume of a particular resident of the controlled-environment facility, and the calling restriction is initiated and removed, or the increase in calling allocation is initiated and removed, with respect to that particular resident.

7. The system of claim 1, wherein the controlled-environment facility resident call volume is the call volume of a particular housing area of the controlled-environment facility, and the calling restriction is initiated and removed, or the increase in calling allocation is initiated and removed, with respect to the particular housing area.

8. The system of claim 1, wherein the controlled-environment facility resident call volume is the call volume of residents of a particular housing area of the controlled-environment facility, and the calling restriction is initiated and removed, or the increase in calling allocation is initiated and removed, with respect to the residents of the particular housing area.

9. The system of claim 1, further comprising controlled-environment facility communications devices, each located in and/or associated with a particular housing area of the controlled-environment facility, wherein the controlled-environment facility resident call volume is the call volume on one or more controlled-environment facility communications devices located in one particular housing area, and the program instructions, upon execution by the processor, further cause the controlled-environment facility secure communication platform to initiate and remove the calling restriction, or initiate and remove the increase in calling allocation, with respect to the controlled-environment facility communications devices located in the one particular housing area.

10. The system of claim 1 wherein the controlled-environment facility resident call volume is the call volume into and/or out of the controlled-environment facility, and the program instructions, upon execution by the processor, further cause the controlled-environment facility secure communication platform to initiate and remove the calling restriction, or initiate and remove the increase in calling allocation, with respect to controlled-environment facility resident communications devices located in and/or associated with the controlled-environment facility.

11. A method for dynamic controlled-environment facility resident communication allocation comprising:
monitoring, by a controlled-environment facility calling allocation system, controlled-environment facility resident call volume, comprising at least the number and/or duration of calls;
recognizing, by the controlled-environment facility calling allocation system, an average call volume by, at least in part recognizing an average call velocity, comprising the volume of calls over a predetermined period of time;
detecting, by the controlled-environment facility calling allocation system, an increase in call volume above the average call volume by, at least in part, detecting an increase in call velocity, or a decrease in call volume below the average call volume by, at least in part, detecting a drop in call velocity;
automatically initiating, by the controlled-environment facility calling allocation system:
a controlled-environment facility resident calling restriction in response to detecting the increase in call volume above the average call volume; or
an increase in controlled-environment facility resident calling allocation in response to detecting the decrease in call volume below the average call volume;
determining, by the controlled-environment facility calling allocation system, the call volume approaches the average call volume by, at least in part, determining the call velocity approaches the average call velocity; and
automatically removing, by the controlled-environment facility calling allocation system:
the calling restriction upon the call volume dropping to a first predetermined threshold in accordance with the average call volume; or
the increase in calling allocation upon the call volume rising to a second predetermined threshold in accordance with the average call volume.

12. The method of claim 11, wherein the calling restriction limits at least one of a number of calls a particular controlled-environment facility resident can make and an amount of time the particular resident can use at least one type of controlled-environment facility communication device, and the increase in calling allocation increases at least one of the number of calls a particular controlled-environment facility resident can make and the amount of time the particular resident can use at least one type of controlled-environment facility communication device.

13. The method of claim 11, wherein the calling restriction comprises allowing more shorter calls or fewer longer calls, and the increase in calling allocation allows more calls and/or longer calls.

14. The method of claim 11, wherein the calling restriction comprises at least one of:
limiting a number of calls a particular controlled-environment facility resident can make and not limiting an amount of time the particular resident can use at least one type of controlled-environment facility communication device; and
limiting an amount of time the particular resident can use at least one same or other type of controlled-environment facility communication device and not limiting a number of calls the particular resident can make on the at least one same or other type of controlled-environment facility communication device.

15. The method of claim 11, wherein increasing the calling allocation comprises increasing the number of calls a particular controlled-environment facility resident can make on, and/or an amount of time the particular resident can use, at least one type of controlled-environment facility communication device.

16. The method of claim 11 wherein the controlled-environment facility resident call volume is the call volume of a particular resident of the controlled-environment facility, and the calling restriction is initiated and removed, or the increase in calling allocation is initiated and removed, with respect to that particular resident.

17. The method of claim 11 wherein the controlled-environment facility resident call volume is the call volume of a particular housing area of the controlled-environment facility, and the calling restriction is initiated and removed, or the increase in calling allocation is initiated and removed, with respect to the particular housing area.

18. The method of claim 11 wherein the controlled-environment facility resident call volume is the call volume of residents of a particular housing area of the controlled-environment facility, and the calling restriction is initiated and removed, or the increase in calling allocation is initiated and removed, with respect to the residents of the particular housing area.

19. The method of claim 11 wherein the controlled-environment facility resident call volume is the call volume on controlled-environment facility communications devices located in and/or associated with a particular housing area of the controlled-environment facility, and the calling restriction is initiated and removed, or the increase in calling allocation is initiated and removed, with respect to the controlled-environment facility communications devices located in the one particular housing area.

20. The method of claim 11 wherein the controlled-environment facility resident call volume is the call volume into and/or out of the controlled-environment facility, and the calling restriction is initiated and removed, or the increase in calling allocation is initiated and removed, with respect to controlled-environment facility resident communications devices located in and/or associated with the controlled-environment facility.

21. A computer readable non-transitory medium having program instructions stored thereon that upon execution by a controlled-environment facility secure communication platform, cause the controlled-environment facility secure communication platform to:

monitor controlled-environment facility resident call volume, comprising at least the number and/or duration of calls;

recognize an average call volume by, at least in part, recognizing an average call velocity, comprising the volume of calls over a predetermined period of time detect an increase in call volume above the average call by, at least in part, detecting an increase in call velocity, or detect a decrease in call volume below the average call volume by, at least in part, detecting a drop in call velocity;

automatically initiate a controlled-environment facility resident calling restriction in response to a detected increase in call volume or automatically initiate an increase in controlled-environment facility resident calling allocation in response to a detected decrease in call volume below the average call volume;

determine the call volume approaches the average call volume, by at least in part determining the call velocity approaches the average call velocity; and automatically remove the calling restriction upon the call volume dropping to a first predetermined threshold in accordance with the average call volume or automatically remove the increase in calling allocation upon the call volume rising to a second predetermined threshold in accordance with the average call volume.

\* \* \* \* \*